J. SHARP.
SPRING WHEEL.
APPLICATION FILED MAR. 21, 1910.
988,952.
Patented Apr. 4, 1911.
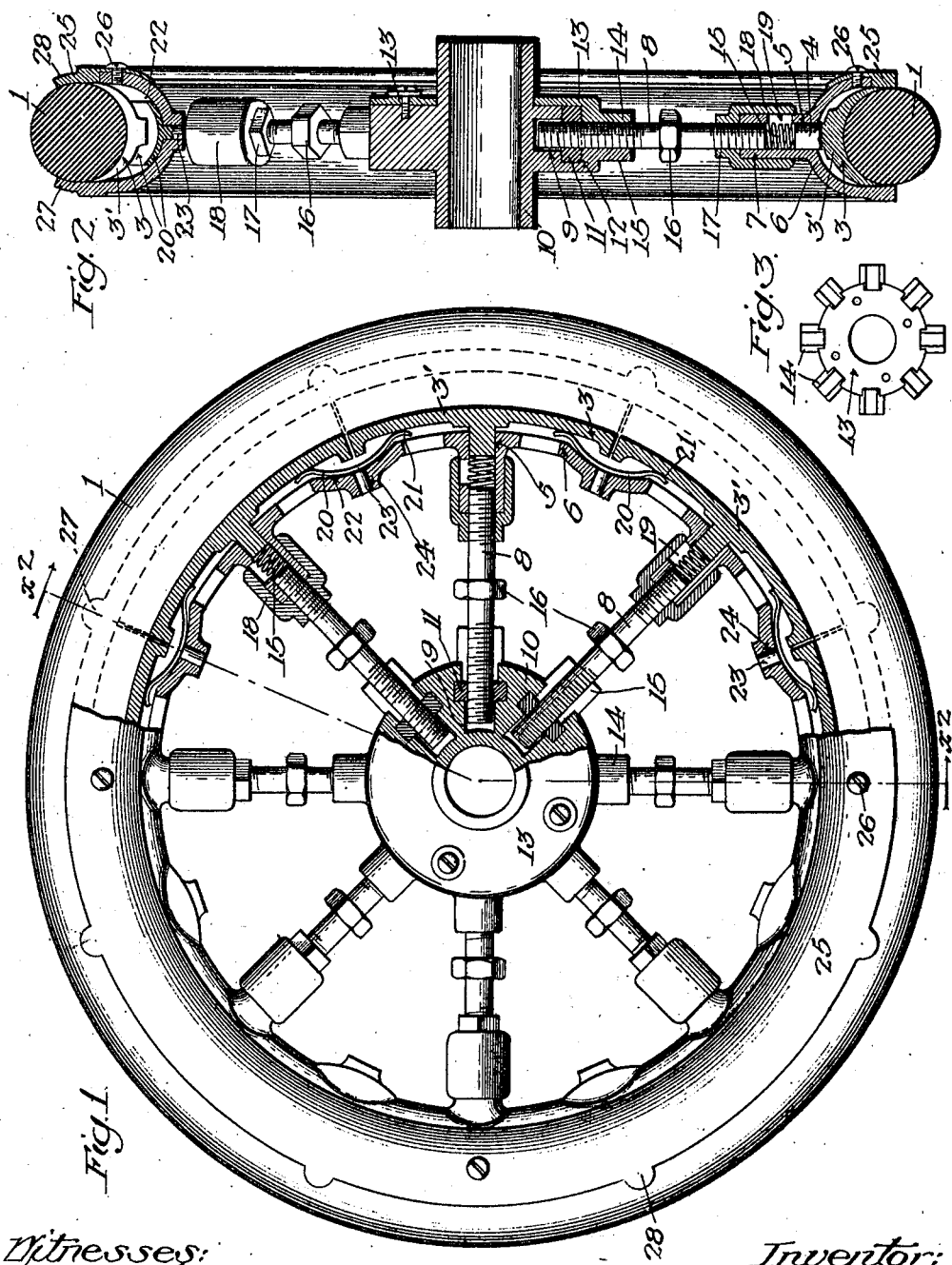

UNITED STATES PATENT OFFICE.

JOHN SHARP, OF BEAUMONT, TEXAS.

SPRING-WHEEL.

988,952.  Specification of Letters Patent.  Patented Apr. 4, 1911.

Application filed March 21, 1910. Serial No. 550,767.

*To all whom it may concern:*

Be it known that I, JOHN SHARP, a citizen of the United States, residing at Beaumont, county of Jefferson, and State of Texas, have invented a new and useful Spring-Wheel, of which the following is a specification.

My invention relates to vehicle wheels which are equipped with a solid tire and one of the objects of my invention is to provide a wheel of the character described with a simple form of elastic support.

Another object of my invention is to provide a wheel of the character described which is simple and economical in construction and which has its parts so arranged that they are readily accessible for dismounting.

Other objects and advantages will appear as hereinafter described.

Referring to the drawings: Figure 1 is a side elevation, partly in section, of a wheel embodying my invention. Fig. 2 is a section on line $x^2$—$x^2$ Fig. 1. Fig. 3 is a view of the inner face of the hub plate.

1 designates a solid tire of rubber or other similar material seated within a groove formed in a sectional rim 3. Each section 3' of the rim 3 is provided with a pin 4 which projects inwardly therefrom into a perforation 5 in the felly 6. The perforation 5 extends through a round boss 7 formed on the inner side of the felly 6 and the inner end of the perforation is threaded to receive the threaded outer end of a spoke 8. The inner end of each spoke 8 is threaded and is freely movable radially in a perforation 9 in the hub 10, the threaded end of the spoke being engaged by a nut 11 held in fixed position in the hub by the walls of a recess 12 therein. The hub 10 is provided with a plate 13 screwed to the face of the hub which closes the open side of the recess 12 and has extensions or lugs 14 formed with a recess half the diameter of the spoke for receiving the spoke, the hub being also provided with corresponding extensions 15 so that each spoke is embraced between an extension 14 and 15, thereby preventing dirt and grit from entering the recesses 9 and 12 in the hub. Within each perforation 5 and between the outer end of each spoke and the corresponding pin 4 on the rim 3 is a coiled compression spring 15, the tension of which may be regulated by changing the radial position of the spoke 8, a nut 16 being formed on the spoke 8 for engagement by a suitable wrench or other engaging means.

The spokes are secured in a desired position by means of a jam nut 17 which is provided with a sleeve 18 which fits over the boss 7. Each boss 7 is provided with an opening 19 through which the spring 15 may be inserted to its proper position between the end of the spoke and the adjacent pin. The sleeve 18 on the nut 17 is made of sufficient length to cover the opening 19 when the jam nut 17 is tightened against the end of the boss 7. The jam nuts 17 are also for the purpose of keeping the felly 6 in fixed position concentric with the hub. The adjacent ends of the sections 3' are supported on the felly 6 by bowed springs 20 which span the joint between the sections 3' and have their ends 21 pressing against the sections 3'. The central or bowed part of each spring 20 rests within a recess 22 in the felly 6. To prevent displacement of the springs 22, each spring is provided with a pin 23 which fits within a perforation 24 in the felly.

The outer side of the grooved portion of the felly 6 is of less diameter than the inner side so that the tire and rim sections may be readily assembled, a circular rim or plate 25 is fastened to the outer side of the felly 6 by means of screws or bolts 26. The plate 25 and the corresponding extension on the felly 6 serve to assist in keeping the rim sections and tire in place and to also, to a certain extent, prevent dirt from entering between the rim sections and the felly. The plate 25 and the corresponding extension on the felly 6 are provided with rounded lips or lugs 27, 28, respectively, which assist in preventing foreign matter entering the joint between the adjacent rim sections 3'.

What I claim is:

1. A spring wheel for vehicles, comprising a solid tire, a rim supporting said tire formed in sections, a felly spaced apart from the rim and having perforations therein, said felly having recesses on the outer surface thereof, a hub, spokes extensibly mounted in said hub and having their outer ends extending into perforations in said felly, coiled springs in said spoke receiving perforations between the ends of said spokes and the rim, and bowed springs seated in the recesses in said felly and secured thereto intermediate said spokes, said bowed springs being arranged to span the break between the sections of said rim and having their ends engaging the ends of the adjacent sections of said rim.

2. A spring wheel for vehicles, comprising a solid tire, a rim supporting said tire formed in sections, each section having a pin thereon, a felly spaced apart from the rim and having perforations therein for receiving said pins, a hub having recesses therein, a threaded member in each of said recesses, spokes having their inner ends correspondingly threaded and radially adjustable in said members, the outer ends of said spokes extending into the perforations in the felly, a coiled spring in each of said perforations between the ends of the spoke and pin therein, and bowed springs on said felly intermediate said spokes, said springs being interposed between the ends of said rim sections and said felly.

3. A spring wheel for vehicles, comprising a solid tire, a rim supporting said tire formed in sections, each section of said rim having a pin thereon, a felly spaced apart from said rim and having bosses extending inwardly therefrom, said felly having perforations therein through said bosses, the pin on each rim section extending into the adjacent perforation in the felly, a hub, spokes adjustably mounted on said hub, the outer ends of said spokes extending into the perforations in said bosses, a coiled spring in each perforation between the ends of the spoke and pin therein, said bosses having a transverse opening therein opening into the perforation therein, and a nut on each of said spokes against the inner face of the boss and having a hollow extension over the end of said boss to close said transverse opening.

In testimony whereof, I have hereunto set my hand at Beaumont, Texas, this 8th day of March 1910.

JOHN SHARP.

In presence of—
J. S. WHELESS,
L. J. CUNNINGHAM.

---

Copies of this patent may be obtained for five cents each, by addressing the "Commissioner of Patents, Washington, D. C."